(12) United States Patent
Hao et al.

(10) Patent No.: US 9,182,629 B2
(45) Date of Patent: Nov. 10, 2015

(54) LED BACKLIGHT SOURCE DRIVE CIRCUIT, LED BACKLIGHT SOURCE AND LIQUID CRYSTAL DISPLAY DEVICE

(75) Inventors: Wei Hao, Qingdao (CN); Xiaoguang Xin, Qingdao (CN); Hongbo Chi, Qingdao (CN); Zhenhua Pang, Qingdao (CN)

(73) Assignee: HISENSE HIVIEW TECH CO., LTD., Qingdao, Shandong Province (CN)

( * ) Notice: Subject to any disclaimer, the term of this patent is extended or adjusted under 35 U.S.C. 154(b) by 106 days.

(21) Appl. No.: 13/809,867

(22) PCT Filed: Dec. 31, 2011

(86) PCT No.: PCT/CN2011/085127
§ 371 (c)(1),
(2), (4) Date: Jan. 11, 2013

(87) PCT Pub. No.: WO2012/139403
PCT Pub. Date: Oct. 18, 2012

(65) Prior Publication Data
US 2013/0120687 A1    May 16, 2013

(30) Foreign Application Priority Data
Apr. 12, 2011  (CN) .......................... 2011 1 0091210

(51) Int. Cl.
| G02F 1/1335 | (2006.01) |
| G09G 3/34 | (2006.01) |
| H05B 37/02 | (2006.01) |
| H05B 33/08 | (2006.01) |
| G09G 3/36 | (2006.01) |

(52) U.S. Cl.
CPC ........ *G02F 1/133603* (2013.01); *G09G 3/3406* (2013.01); *H05B 33/086* (2013.01);
(Continued)

(58) Field of Classification Search
CPC .......... G09G 3/3406; G09G 2330/021; G09G 2330/02; G09G 3/3413; G09G 2330/04; H05B 33/0815; H05B 33/0827; H05B 37/02; H05B 37/00; G02F 1/133603; G02F 2001/133612; G02F 1/1336
USPC .......... 345/102, 204, 211, 212; 315/307, 192, 315/291, 297, 121; 349/61
See application file for complete search history.

(56) References Cited

U.S. PATENT DOCUMENTS

2007/0273681 A1* 11/2007 Mayell .......................... 345/211
2009/0195163 A1*  8/2009 Nguyen et al. ................. 315/122
(Continued)

FOREIGN PATENT DOCUMENTS

| CN | 2857404 Y | 1/2007 |
| CN | 2884777 Y | 3/2007 |

(Continued)

*Primary Examiner* — Koosha Sharifi-Tafreshi
(74) *Attorney, Agent, or Firm* — Cheng-Ju Chiang (57) ABSTRACT

An LED backlight source drive circuit, an LED backlight source and a liquid crystal display device are provided. LED backlight source drive circuit includes a voltage input terminal, a coupling module, and a rectifier module. The coupling module is connected to the voltage input terminal for receiving a current complying with a total working voltage of two power consumption modules from the voltage input terminal, and converting the current into a current complying with a working voltage of one power consumption module. The rectifier module is connected to the coupling module for inputting the current complying with the working voltage of one power consumption module into two serially-connected power consumption modules, thereby supplying power to the power consumption modules. The LED backlight source and the liquid crystal display device include two power consumption modules and the above LED backlight source drive circuit.

17 Claims, 7 Drawing Sheets

(52) U.S. Cl.
CPC ........ *H05B33/0821* (2013.01); *H05B 33/0827* (2013.01); *H05B 37/02* (2013.01); *G09G 3/36* (2013.01); *G09G 2330/02* (2013.01)

(56) References Cited

U.S. PATENT DOCUMENTS

2010/0060190 A1* 3/2010 Cheng ............................ 315/291
2011/0018463 A1* 1/2011 Lin et al. ....................... 315/294
2011/0156615 A1* 6/2011 Chang et al. ................... 315/297
2014/0055057 A1* 2/2014 Kim et al. ...................... 315/294

FOREIGN PATENT DOCUMENTS

| CN | 101404840 A | 4/2009 |
| CN | 101778506 A | 7/2010 |
| CN | 102065615 A | 5/2011 |
| CN | 201994045 U | 9/2011 |

* cited by examiner

LED BACKLIGHT SOURCE DRIVE CIRCUIT, LED BACKLIGHT SOURCE AND LIQUID CRYSTAL DISPLAY DEVICE

CROSS-REFERENCE TO RELATED APPLICATION

The present application claims the benefit of priority to Chinese Application No. 201110091210.2, filed Apr. 12, 2011 in China, entitled "Driving circuit and LCD TV", the entire content of which is hereby incorporated herein by reference for all purposes. The present application is also a 35 U.S.C. §371 National Phase conversion of International (PCT) Patent Application No. PCT/CN2011/085127, filed on Dec. 31, 2011, the disclosure of which is incorporated by reference herein. The PCT International Patent Application was published in Chinese.

FIELD OF THE INVENTION

The present invention relates to an electronic technology, and more particularly to an LED backlight source drive circuit, an LED backlight source and a liquid crystal display device with the LED backlight source drive circuit.

BACKGROUND OF THE INVENTION

With the rapid development of electronic technologies, liquid crystal display devices become more popular. As known, a drive circuit is used for driving the backlight source of an electronic device such as a liquid crystal display device or a liquid crystal computer.

Figure 1:
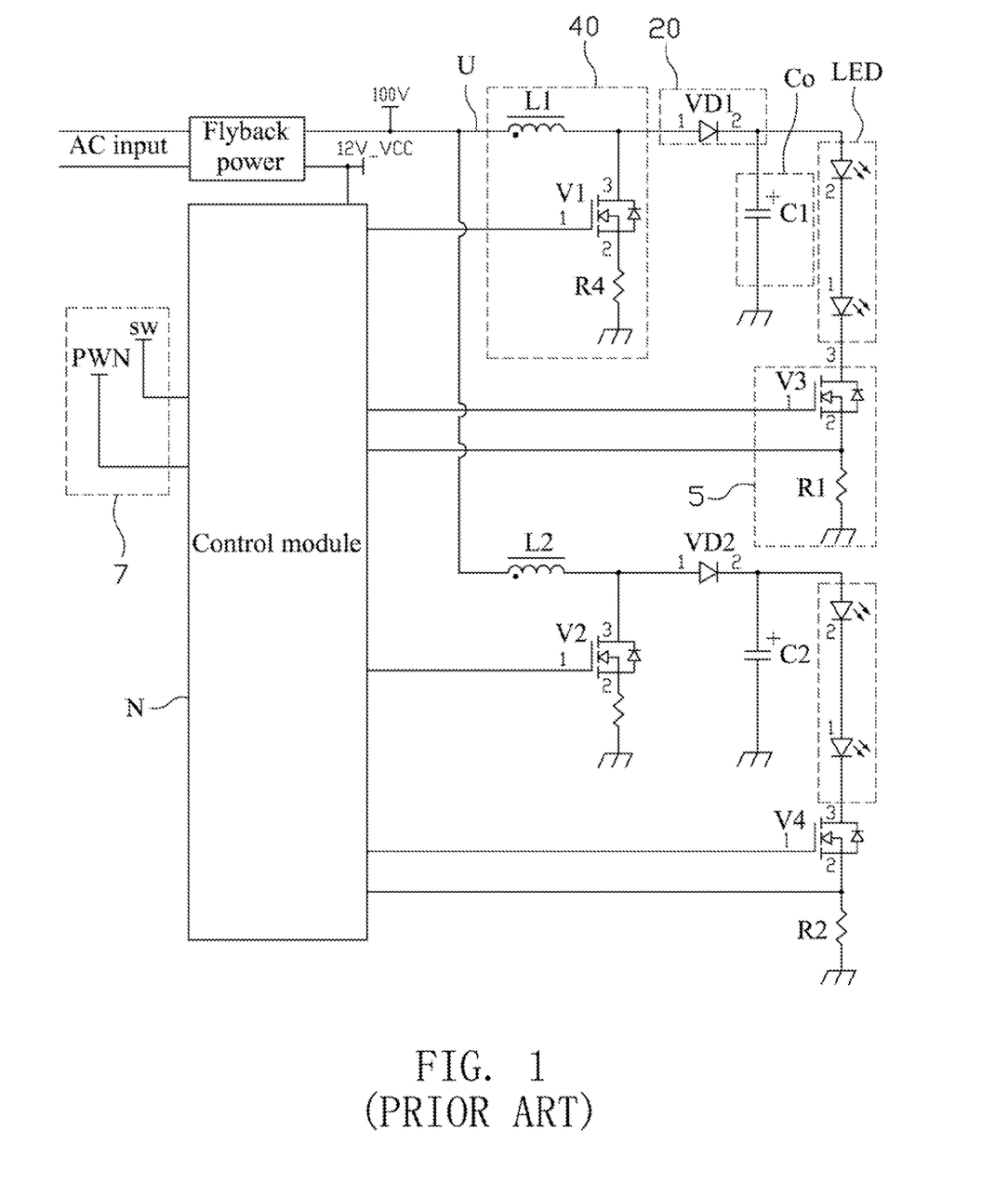
FIG. 1 is a schematic circuit diagram illustrating the connection between a drive circuit and LED light strips of a conventional liquid crystal display device.

FIG. 1 is a schematic circuit diagram illustrating the connection between a drive circuit and LED light strips of a conventional liquid crystal display device. As shown in FIG. 1, the LED backlight source of the liquid crystal display device is an LED light strip. The drive circuit for driving the LED light strip comprises an external power supply input terminal U, a boost module 40, a control module N, a rectifier module 20, a filtering module Co, a current sampling module 5, and a light-adjusting module 7.

The boost module 40 is used for receiving the current from the external power supply input terminal U and converting the current into an increased voltage required to power the LED light strip. Then, the increased voltage from the boost module 40 is transmitted to the rectifier module 20.

By the rectifier module 20, the current from the boost module 40 is rectified into a rectified current, and the rectified current is inputted into the filtering module Co and the LED light strips.

The filtering module Co is used for storing the current from the boost module 40 and gradually releasing the current to the LED light strip.

The light-adjusting module 7 is used for receiving a light-adjusting signal and a start signal from an external circuit board (not shown), and transmitting the light-adjusting signal and the start signal to the control module N.

After the start signal is received by the control module N, the control module N enters a working state. In the working state, the magnitude of the current flowing through the LED light strip is sensed by the control module N through the current sampling module 5. According to the light-adjusting signal, the current from the boost module 40 to the rectifier module 20 is adjusted to a desired magnitude by the control module N.

Moreover, the boost module 40 comprises an inductor and a MOS transistor. By controlling the frequency of turning on/off the MOS transistor, the magnitude of the voltage corresponding to the output current of the boost module 40 is controlled by the control module N.

In accordance with the conventional driving method, a boost module 40 is able to drive only one corresponding LED light strip. That is, the drive circuit composed of one boost module 40, one rectifier module 20, one filtering module Co and one current sampling module 5 can be used for driving one LED light strip. For driving two LED light strips, the drive circuit should comprise two boost modules 40, two rectifier modules 20, two filtering modules Co and two current sampling modules 5, and the control module N should be implemented by multiple chips.

From the above discussions, it is found that the conventional drive circuit for driving the LED light strips still has some drawbacks.

For example, if only two LED light strips are installed in an electronic device, the drive circuit for driving these two LED light strips needs two boost modules 40 as shown in FIG. 1. Since the electronic components of the boost module 40 are relatively costly, the electronic device with the drive circuit has higher fabricating cost.

SUMMARY OF THE INVENTION

The present invention provides an LED backlight source drive circuit, an LED backlight source and a liquid crystal display device with the LED backlight source drive circuit in order to reduce the cost of the electronic device with the drive circuit.

For achieving the above objects, the present invention provides the following technologies.

In accordance with an aspect, the present invention provides an LED backlight source drive circuit. The LED backlight source drive circuit includes a voltage input terminal, a coupling module, and a rectifier module. The coupling module is connected to the voltage input terminal for receiving a current complying with a total working voltage of two power consumption modules from the voltage input terminal, and converting the current into a current complying with a working voltage of one power consumption module. The rectifier module is connected to the coupling module for inputting the current complying with the working voltage of one power consumption module into two serially-connected power consumption modules, thereby supplying power to the power consumption modules.

In an embodiment, the coupling module includes at least one capacitor or at least two serially-connected or parallel-connected capacitors; and/or the two power consumption modules have the same power; and/or each of the two power consumption modules includes one LED light strip or at least two serially-connected LED light strips; and/or the rectifier module includes a rectifying unit and an energy storage unit. The rectifying unit is configured for inputting the current complying with the working voltage of one power consumption module into the energy storage unit. The energy storage unit is configured for receiving and storing the current from the rectifying unit, and inputting the current into the two power consumption modules.

In an embodiment, the capacitor of the coupling module is an electrodeless capacitor; and/or the rectifying unit includes a first diode and a second diode, the energy storage unit includes a first capacitor and a second capacitor, and the two power consumption modules includes a first power consumption module and a second power consumption module. An anode of the first diode is connected to the coupling module, a cathode of the first diode is connected to a current input terminal of the first power consumption module, and a current output terminal of the first power consumption module is connected to a current input terminal of the second power consumption module and a ground terminal. A cathode of the second diode is connected to the coupling module, and an anode of the second diode is connected to a current output terminal of the second power consumption module. Two ends of the first capacitor are connected between the current input terminal and the current output terminal of the first power consumption module. Two ends of the second capacitor are connected between the current input terminal and the current output terminal of the second power consumption module.

In an embodiment, the coupling module, the first capacitor and/or the second capacitor are polypropylene capacitors.

In an embodiment, the LED backlight source drive circuit further includes a voltage conversion module, a control module and a current sampling module. The voltage conversion module is connected to the control module and the coupling module, and the current sampling module is connected to the control module and a current output terminal of the first power consumption module. The voltage conversion module is configured for receiving the current from a current output terminal of an external power source, and converting the current into the current complying with the total working voltage of two power consumption modules to be inputted into the coupling module. The control module is configured for sensing a magnitude of the current from the current output terminal of the first power consumption module through the current sampling module, and allowing the current outputted from the voltage conversion module to be used as a working current of the power consumption modules.

In an embodiment, the voltage conversion module is a boost circuit; and/or the control module is a control chip; and/or the current sampling module includes a first bipolar junction transistor, a first resistor and a second resistor. The first resistor is connected between the current output terminal of the first power consumption module and a ground terminal. A base of the first bipolar junction transistor is connected to a node between the current output terminal of the first power consumption module and the first resistor through the second resistor. An emitter of the first bipolar junction transistor is connected to the ground terminal, and a collector of the first bipolar junction transistor is connected to the control module. A magnitude of the current and/or the voltage from the current output terminal of the first power consumption module is sensed by the control module through the collector of the first bipolar junction transistor.

In an embodiment, the LED backlight source drive circuit further includes a protecting module. The protecting module is connected to the control module. If the power consumption module is in an open-circuit state, an over-current state or a short-circuit state, the protecting module issues a high or low voltage-level fault signal to the control module. After the fault signal is received by the control module, the voltage conversion module is disabled by the control module.

In an embodiment, the voltage conversion module includes a boost inductor, a MOS transistor and a fourth resistor, the protecting module includes a NPN bipolar junction transistor, a PNP bipolar junction transistor, an energy storage capacitor, a fifth resistor, a sixth resistor and a regulator diode. A current input terminal of the boost inductor is connected to the current output terminal of the external power source, and a current output terminal of the boost inductor is connected to a drain terminal of the MOS transistor and the voltage input terminal. A source terminal of the MOS transistor is connected to the ground terminal through the fourth resistor, and a terminal of the MOS transistor is connected to the control module. An anode of the regulator diode is connected to the voltage input terminal, and a cathode of the regulator diode is connected to the ground terminal through the energy storage capacitor. The fifth resistor and the sixth resistor are connected to each other in series, and the energy storage capacitor is connected to the serially-connected fifth resistor and sixth resistor in parallel. The cathode of the regulator diode is connected to a node between the fifth resistor and the sixth resistor. The anode of the regulator diode is connected to the source terminal of the MOS transistor the control module, a base of the NPN bipolar junction transistor and an emitter of the PNP bipolar junction transistor. An emitter of the NPN bipolar junction transistor is connected to the ground terminal, and a collector of the NPN bipolar junction transistor is connected to a base of the PNP bipolar junction transistor. A collector of the PNP bipolar junction transistor is connected to the control module, an emitter of the PNP bipolar junction transistor is connected to a constant voltage source, and the fault signal is a voltage signal that is outputted from the constant voltage source.

In an embodiment, the control module includes a controlling unit, a feedback pin, a start pin, a protection pin, a drive pin and a supply voltage pin. The feedback pin is connected to the collector of the first bipolar junction transistor. The start pin is connected to a start signal input terminal and a light-adjusting signal input terminal of an external circuit board. The protection pin is connected to the source terminal of the MOS transistor, the anode of the regulator diode and the collector of the PNP bipolar junction transistor. The drive pin is connected to a gate terminal of the MOS transistor. The supply voltage pin is connected to the current output terminal of the external power source for receiving the current from the external power source. According to a start signal received by the start signal input terminal, the controlling unit issues a high or low voltage-level control signal to the voltage conversion module through the drive pin, thereby enabling or disabling the voltage conversion module. According to a light-adjusting signal received by the light-adjusting signal input terminal, the controlling unit changes a duty cycle of the high or low voltage-level control signal that is issued through the drive pin, so that a frequency of enabling or disabling the voltage conversion module is controlled by the controlling unit. After the fault signal is received by the protection pin, the voltage conversion module is disabled by the controlling unit.

In accordance with another aspect, the present invention provides a liquid crystal display device. The liquid crystal display device includes two power consumption modules and the above LED backlight source drive circuit of the present invention. The LED backlight source drive circuit is used for supplying power to the power consumption modules. Each of the power consumption modules includes one LED light strip or at least two serially-connected LED light strips.

In accordance with another aspect, the present invention provides an LED backlight source. The LED backlight source includes two power consumption modules and the above LED backlight source drive circuit of the present invention. The LED backlight source drive circuit is used for supplying power to the power consumption modules. Each of the power consumption modules includes one LED light strip or at least two serially-connected LED light strips.

In the liquid crystal display device of the present invention, the coupling module is used for receiving a current complying with the total working voltage of two power consumption modules from the voltage input terminal, and converting the current into a current complying with the working voltage of one power consumption module (e.g. one LED light strip). In addition, the rectifier module is used for inputting the current complying with the working voltage of one power consumption module into two serially-connected power consumption modules in order to supply power to the power consumption modules. In other words, the voltage input terminal is only connected to one boost module to supply power to the power consumption modules (e.g. two LED light strips). In comparison with the conventional drive circuit with the boost modules, the drive circuit of the present invention needs only one boost module. Correspondingly, the peripheral circuit of the boost module is simplified.

Moreover, since the electronic components of the coupling module and the rectifier module of the drive circuit of the present invention are much cheaper than the electronic components of one boost module, the cost of the drive circuit of the present invention for driving two LED light strips is reduced when compared with the conventional drive circuit. In other words, the liquid crystal display device with the LED backlight source drive circuit can solve the drawbacks of the conventional electronic device.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present invention provides an LED backlight source drive circuit and an LED backlight source with less number of electronic device and lower cost. The present invention also provides a liquid crystal display device with the LED backlight source drive circuit.

Figure 2:
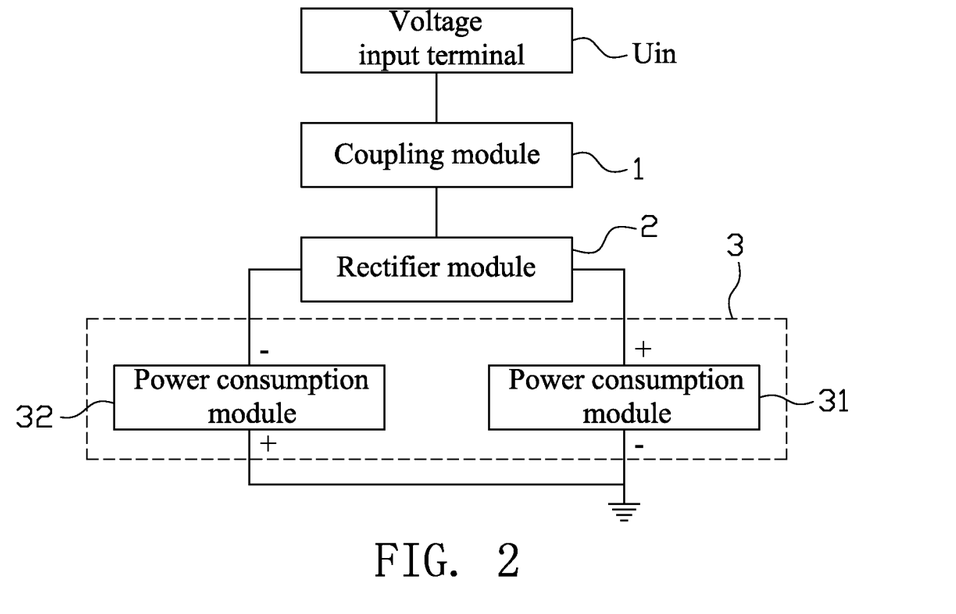
FIG. 2 is a schematic circuit diagram illustrating the connection between an LED backlight source drive circuit and power consumption modules according to an embodiment of the present invention.
Figure 3:
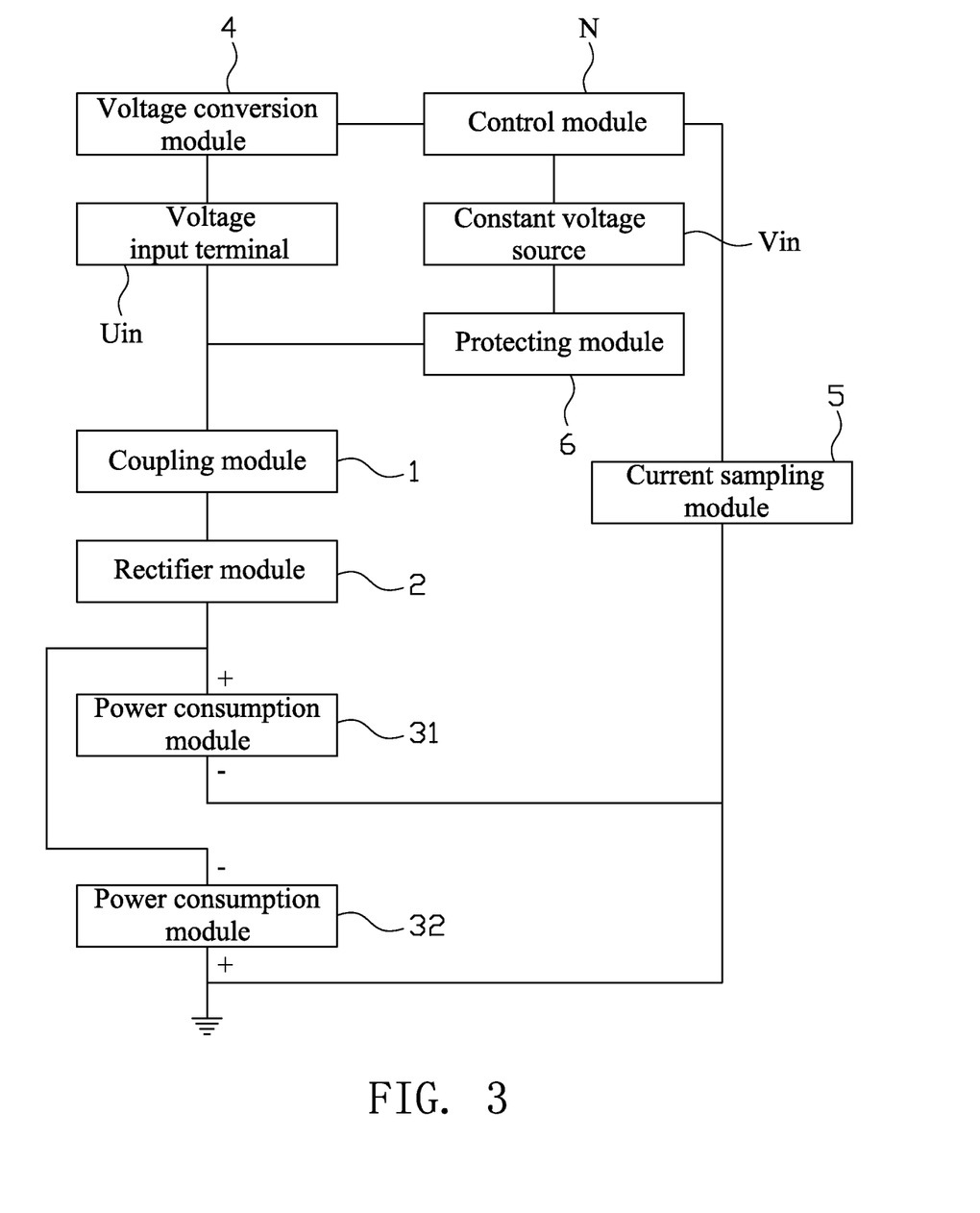
FIG. 3 is a schematic circuit diagram illustrating the connection between an LED backlight source drive circuit and power consumption modules according to another embodiment of the present invention.
Figure 4:
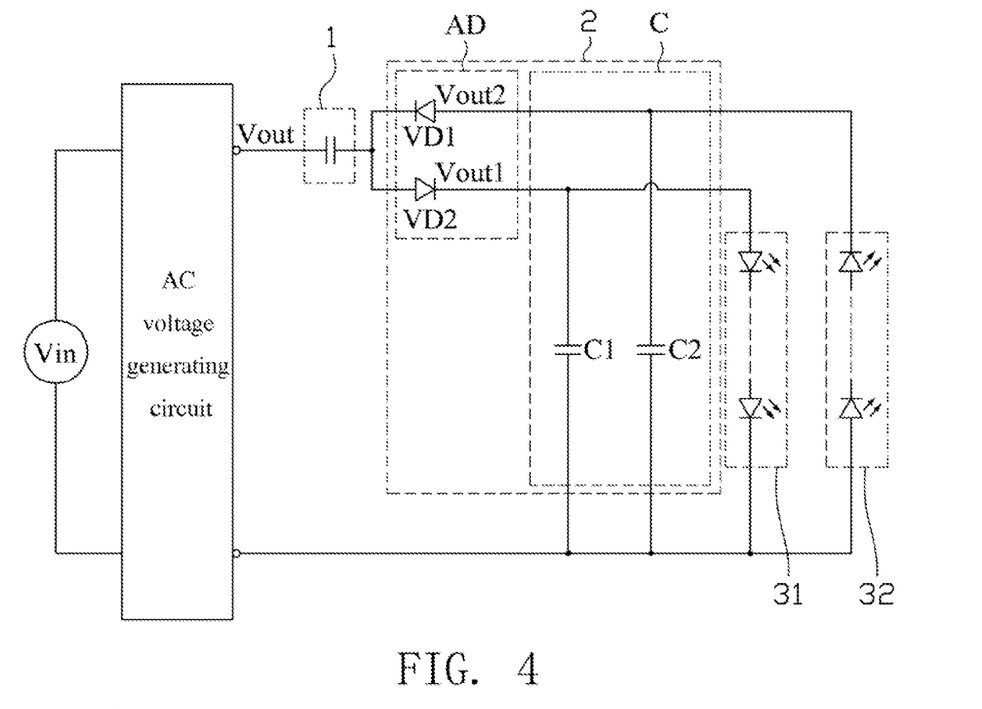
FIG. 4 is a schematic circuit diagram illustrating the connection between an LED backlight source drive circuit and power consumption modules according to another embodiment of the present invention.

As shown in FIGS. 2, 3 and 4, the drive circuit comprises a voltage input terminal Uin, a coupling module 1, and a rectifier module 2. The coupling module 1 is connected to the voltage input terminal Uin. The rectifier module 2 is connected to the coupling module 1.

The coupling module 1 is used for receiving a current complying with the total working voltage of two power consumption modules 3 from the voltage input terminal Uin, and converting the current into a current complying with the working voltage of one power consumption module 3.

The rectifier module 2 is used for inputting the current complying with the working voltage of one power consumption module 3 into two serially-connected power consumption modules 3 in order to supply power to the power consumption modules 3.

In the liquid crystal display device of the present invention, the coupling module 1 is used for receiving a current complying with the total working voltage of two power consumption modules 3 from the voltage input terminal Uin, and converting the current into a current complying with the working voltage of one power consumption module 3 (e.g. one LED light strip). In addition, the rectifier module 2 is used for inputting the current complying with the working voltage of one power consumption module 3 into two serially-connected power consumption modules 3 in order to supply power to the power consumption modules 3. In other words, the voltage input terminal Uin is only connected to one boost module to supply power to the power consumption modules 3 (e.g. two LED light strips). In comparison with the conventional drive circuit with the boost modules, the drive circuit of the present invention needs only one boost module. Since one boost module is saved, the peripheral circuit of the boost module is simplified.

Moreover, since the electronic components of the coupling module 1 and the rectifier module 2 of the drive circuit of the present invention are much cheaper than the electronic components of one boost module, the cost of the drive circuit of the present invention for driving two LED light strips is reduced when compared with the conventional drive circuit. In other words, the liquid crystal display device with the LED backlight source drive circuit can solve the drawbacks of the conventional electronic device.

Please refer to FIGS. 3, 4, 6 and 7. In an embodiment, the coupling module 1 comprises at least one capacitor or at least two serially-connected or parallel-connected capacitors.

Figure 6:
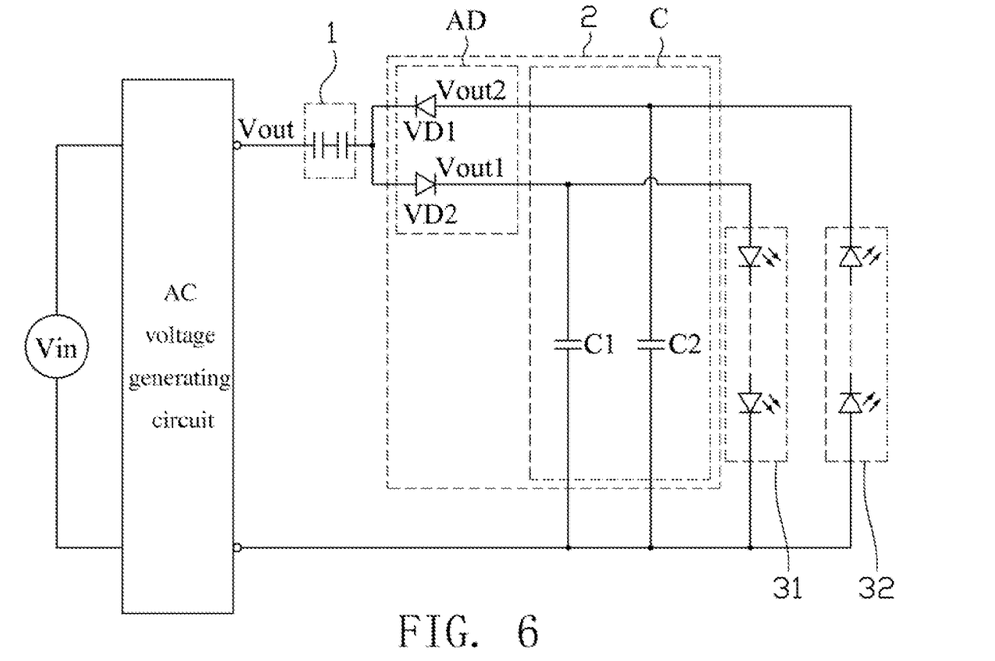
FIG. 6 is a schematic circuit diagram illustrating the connection between an LED backlight source drive circuit and power consumption modules according to another embodiment of the present invention.
Figure 7:
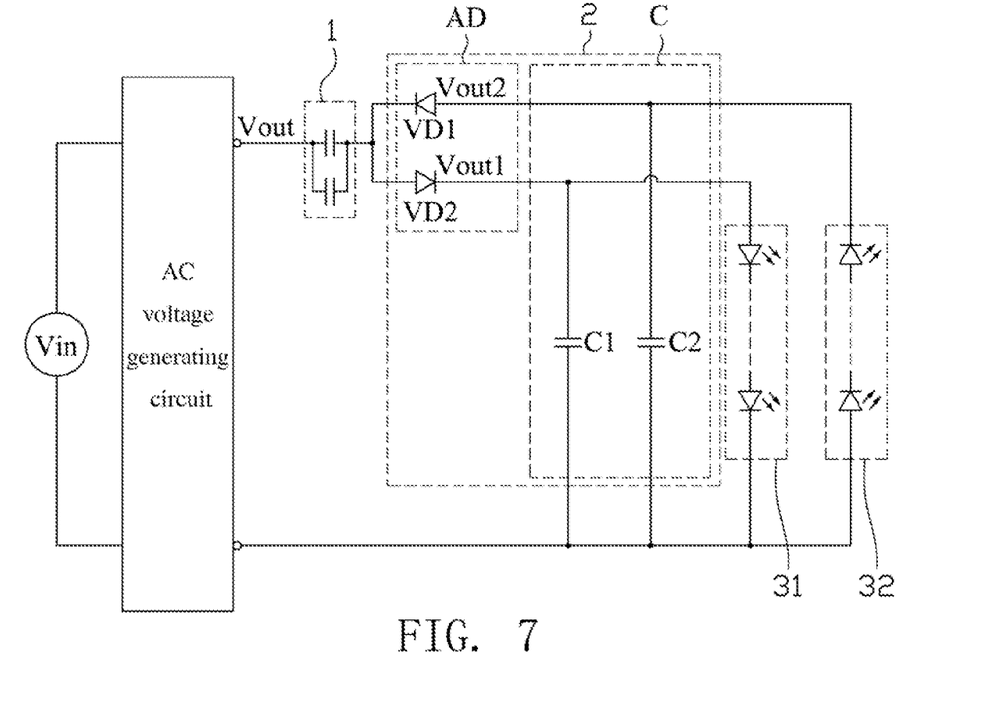
FIG. 7 is a schematic circuit diagram illustrating the connection between an LED backlight source drive circuit and power consumption modules according to another embodiment of the present invention.

For example, as shown in FIGS. 3 and 4, the coupling module 1 comprises a capacitor. For enhancing the utilization flexibility, the coupling module 1 may comprise at least two serially-connected or parallel-connected capacitors. As shown in FIG. 6, two capacitors of the coupling module 1 are connected to each other in series. In a case that the capacitors are connected to each other in series, the coupling module 1 can withstand a higher voltage, so that the coupling module 1 may be applied to a larger number of LED light strips. As shown in FIG. 7, two capacitors of the coupling module 1 are connected to each other in parallel. In a case that the capacitors are connected to each other in parallel, the capacitance of the coupling module 1 is increased, so that the coupling module 1 may be applied to the LED light strip requiring higher current.

Alternatively, in some embodiments, each power consumption module 3 comprises one LED light strip or at least two serially-connected LED light strips.

Alternatively, in some embodiments, the rectifier module 2 comprises a rectifying unit AD and an energy storage unit C. The rectifying unit AD is used for inputting the current complying with the working voltage of one power consumption module 3 into the energy storage unit C. The energy storage unit C is used for receiving and storing the current from the rectifying unit AD, and inputting the current into the two power consumption modules 3.

As known, the capacitor is a cost-effective electronic component. Regardless of whether the coupling module 1 comprises one capacitor or plural serially-connected or parallel-connected capacitors, the coupling module 1 can be used for storing current. In addition, the coupling module 1 may output a current complying with an output voltage that is equal to a half of the input voltage, so that the normal operation of one power consumption module 3 is assured.

By the energy storage unit C, the power consumption module can supply more constant and continuous power. Under this circumstance, the power consumption module 3 can be operated in a reliable and stable working state.

In this embodiment, the capacitor of the coupling module 1 is an electrodeless capacitor; and/or the rectifying unit AD comprises a first diode VD1 and a second diode VD2, the energy storage unit C comprises a first capacitor C1 and a second capacitor C2, and the two power consumption modules 3 comprises a first power consumption module 31 and a second power consumption module 32.

The anode of the first diode VD1 is connected to the coupling module 1. The cathode of the first diode VD1 is connected to a current input terminal of the first power consumption module 31. A current output terminal of the first power consumption module 31 is connected to a current input terminal of the second power consumption module 32 and a ground terminal.

The cathode of the second diode VD2 is connected to the coupling module 1. The anode of the second diode VD2 is connected to a current output terminal of the second power consumption module 32.

The two ends of the first capacitor C1 are connected between the current input terminal and the current output terminal of the first power consumption module 31.

The two ends of the second capacitor C2 are connected between the current input terminal and the current output terminal of the second power consumption module 32.

Moreover, when the electrodeless capacitor is connected to another electronic component, the connecting direction of the capacitor should not be taken into consideration, so that the connection is very simple. Since the technology of the diode is well-established and the diode is cost-effective and easily connected, the rectifying unit with the diodes has many benefits such as cost-effectiveness and reliable performance.

In the above embodiments, the first power consumption module 31, the second power consumption module 32 and the coupling module 1 are collaboratively defined as a closed loop. Consequently, the first power consumption module 31 and the second power consumption module 32 are electrically connected to each other. By the first capacitor C1, the first power consumption module 31 can supply more constant and continuous power. By the second capacitor C2, the second power consumption module 32 can supply more constant and continuous power.

In this embodiment, the capacitor of the coupling module 1, the first capacitor C1 and/or the second capacitor C2 are polypropylene capacitors.

The polypropylene capacitor uses a metal foil as an electrode. After two ends of the metal foil are superimposed with a polypropylene film, the metal foil and the polypropylene film are wound as a cylindrical capacitor. The polypropylene capacitor is electrodeless, and has high insulation impedance, good frequency characteristics, wide frequency response and low dielectric loss. Alternatively, in some other embodiments, the capacitor of the coupling module 1, the first capacitor C1 and/or the second capacitor C2 are not limited to polypropylene capacitors.

Figure 5:
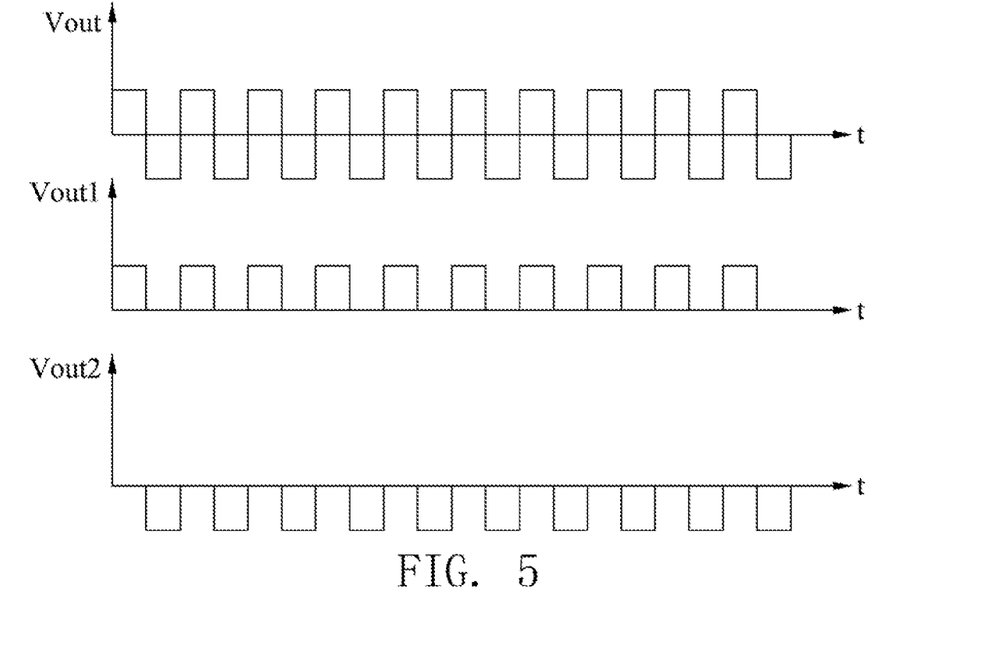
FIG. 5 is a schematic timing waveform diagram illustrating the output voltages of the coupling module and the power consumption modules as shown in FIG. 4.

FIG. 5 is schematic timing waveform diagram illustrating the output voltages of the coupling module 1 and the power consumption modules 3. The waveform diagram Vout indicates the output voltage of the coupling module 1. The waveform diagrams Vout1 and Vout2 indicate the output voltages of the power consumption modules 3.

In the embodiment as shown in FIG. 2, the drive circuit further comprises a voltage conversion module 4, a control module N and a current sampling module 5. The voltage conversion module 4 is connected to the control module N and the coupling module 1. The current sampling module 5 is connected to the control module N and the current output terminal of the first power consumption module 31.

The voltage conversion module 4 is used for receiving the current from a current output terminal of an external power source, and converting the current into a current complying with the total working voltage of two power consumption modules 3, so that the current is inputted into the coupling module 1.

The control module N is used for sensing the magnitude of the current from the current output terminal of the first power consumption module 31 through the current sampling module 5, and allowing the current outputted from the voltage conversion module 4 to be used as the working current of the power consumption modules 3.

If the current from the current output terminal of the external power source complies with a lower voltage, the current is increased by the voltage conversion module 4 to comply with the total working voltage of two power consumption modules 3. Under this circumstance, the voltage conversion module 4 has the function similar to the conventional boost module. On the other hand, if the current from the current output terminal of the external power source complies with a higher voltage, the current is decreased by the voltage conversion module 4 to comply with the total working voltage of two power consumption modules 3.

The control module N is used for sensing the magnitude of the current from the current output terminal of the first power consumption module 31 through the current sampling module 5, and judging whether the magnitude of the sensed current outputted from the voltage conversion module 4 complies with the working current of the power consumption modules 3. If the judging condition is not satisfied, the voltage conversion module 4 is adjusted in real time. By adjusting the output voltage from the voltage conversion module 4, the magnitude of the output current is correspondingly adjusted.

Figure 8:
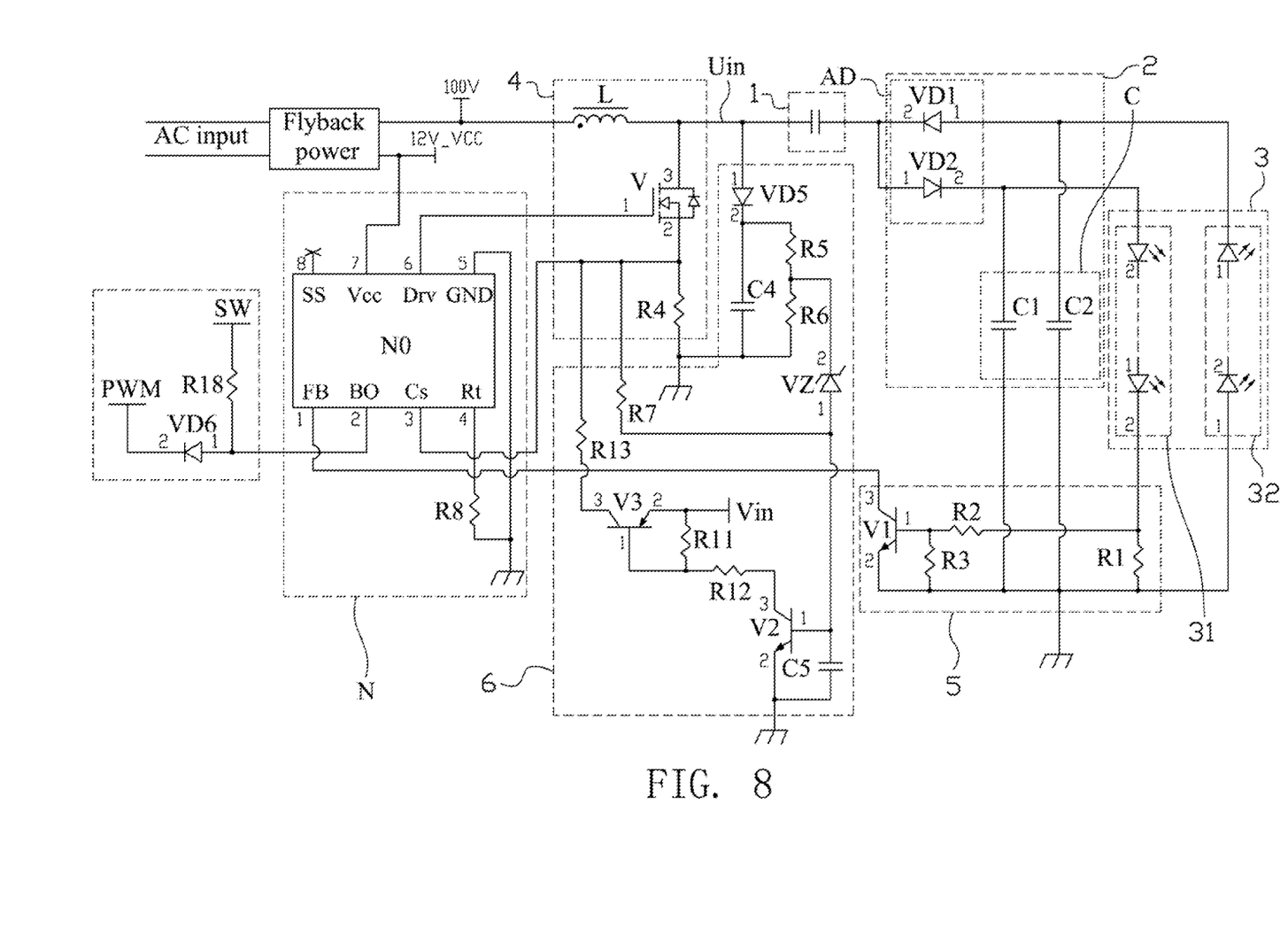
FIG. 8 is a schematic circuit diagram illustrating the connection between an LED backlight source drive circuit and power consumption modules according to another embodiment of the present invention.

As shown in FIG. 8, the voltage conversion module 4 is a boost circuit; and/or the control module N is a NCP series chip; and/or the current sampling module 5 comprises a first bipolar junction transistor V1, a first resistor R1 and a second resistor R2.

The first resistor R1 is connected between the current output terminal of the first power consumption module 31 and the ground terminal.

The base of the first bipolar junction transistor V1 is connected to a node between the current output terminal of the first power consumption module 31 and the first resistor R1 through the second resistor R2.

The emitter of the first bipolar junction transistor V1 is connected to the ground terminal, and the collector of the first bipolar junction transistor V1 is connected to the control module N.

Moreover, through the collector of the first bipolar junction transistor V1, the magnitude of the current and/or the voltage from the current output terminal of the first power consumption module 31 is sensed by the control module N.

Moreover, by selectively turning on or turning off the MOS transistor V of the boost circuit of the voltage conversion module 4, the magnitude of the output voltage from the boost circuit is adjustable. When the MOS transistor V is turned on, the current inputted into the boost circuit is increased and then outputted. When the MOS transistor V is turned off, the boost circuit is disabled.

The NCP series chip has many benefits such as cost-effectiveness and stable performance. It is noted that the control module N is not limited to the NCP series chip.

More preferably, through the collector of the first bipolar junction transistor V1, the magnitude of the current from the current output terminal of the first power consumption module 31 is sensed by the control module N. Under this circumstance, the resistance value of the first resistor R1 should be previously set. If the magnitude of the current from the current output terminal of the first power consumption module 31 is increased and sufficient to turn on the first bipolar junction transistor V1, the control module N may adaptively control the voltage conversion module 4 to decrease the magnitude of the current flowing through the first power consumption module 31. On the other hand, if the magnitude of the current from the current output terminal of the first power consumption module 31 is insufficient to turn on the first bipolar junction transistor V1, the control module N may adaptively control the voltage conversion module 4 to increase the magnitude of the current flowing through the first power consumption module 31.

Please refer to FIGS. 3 and 8 again. The drive circuit of the present invention further comprises a protecting module 6.

The protecting module 6 is connected to the control module N. In a case that the power consumption module 3 is in an open-circuit state, an over-current state or a short-circuit state, the protecting module 6 issues a high or low voltage-level fault signal to the control module N.

After the fault signal is received by the control module N, the voltage conversion module 4 is disabled by the control module N.

After the voltage conversion module 4 is disabled, the task (e.g. a boost operation) of converting the current to comply with the total working voltage of two power consumption modules 3 will be stopped. Since the boost operation of the voltage conversion module 4 is stopped, the current complying with the higher voltage fails to be inputted into the power consumption module 3 or other electronic components. Under this circumstance, the possibility of burning out the power consumption module 3 or other electronic components.

Please refer to FIG. 8 again. In this embodiment, the voltage conversion module 4 comprises a boost inductor L, the MOS transistor V, and a fourth resistor R4. The protecting module 6 comprises a NPN bipolar junction transistor V2, a PNP bipolar junction transistor V3, an energy storage capacitor C4, a fifth resistor R5, a sixth resistor R6, and a regulator diode Vz.

The current input terminal of the boost inductor L is connected to the current output terminal of the external power source. The current output terminal of the boost inductor L is connected to the drain terminal of the MOS transistor V and the voltage input terminal Uin.

The source terminal of the MOS transistor V is connected to the ground terminal through the fourth resistor R4. The gate terminal of the MOS transistor V is connected to the control module N.

The anode of the regulator diode Vz is connected to the voltage input terminal Uin. The cathode of the regulator diode Vz is connected to the ground terminal through the energy storage capacitor C4.

The energy storage capacitor C4 is connected to the serially-connected fifth resistor R5 and sixth resistor R6 in parallel.

The cathode of the regulator diode Vz is connected to a node between the fifth resistor R5 and the sixth resistor R6.

The anode of the regulator diode Vz is connected to the source terminal of the MOS transistor V, the control module N, the base of the NPN bipolar junction transistor V2 and the emitter of the PNP bipolar junction transistor V3.

The emitter of the NPN bipolar junction transistor V2 is connected to the ground terminal. The collector of the NPN bipolar junction transistor V2 is connected to the base of the PNP bipolar junction transistor V3.

The collector of the PNP bipolar junction transistor V3 is connected to the control module N. The emitter of the PNP bipolar junction transistor V3 is connected to a constant voltage source Vin. The fault signal is a voltage signal that is outputted from the constant voltage source Vin.

The boost inductor L has the functions of storing the current and increasing the voltage. When the MOS transistor V is turned off, the boost inductor L may store the current. When the MOS transistor V is turned on, the boost inductor L may output the current complying with a higher voltage. Consequently, by adjusting a duty cycle of the MOS transistor V, the boost operation of the boost module is correspondingly controlled.

In a case that the power consumption module 3 is in the open-circuit state, the output voltage from the voltage conversion module 4 is not suffered from loss, and the output voltage from the voltage conversion module 4 is continuously increased. Meanwhile, the current outputted from the voltage conversion module 4 is stored in the energy storage capacitor C4, and gradually outputted to a voltage divider which is composed by the fifth resistor R5 and the sixth resistor R6. When the voltage at the sixth resistor R6 reaches a threshold voltage of the regulator diode Vz, the regulator diode Vz is turned on. Then, the NPN bipolar junction transistor V2 and the PNP bipolar junction transistor V3 are sequentially turned on. After the PNP bipolar junction transistor V3 is turned on, the constant voltage source Vin issues a high voltage-level fault signal to the control module N. After the current outputted from the constant voltage source Vin is received by the control module N, the voltage conversion module 4 is disabled by the control module N.

In a case that the power consumption module 3 is in the over-current state or the short-circuit state, the voltage at the node between the fourth resistor R4 and the source terminal of the MOS transistor V is increased, and the voltage at the anode of the regulator diode Vz is correspondingly increased. Then, the NPN bipolar junction transistor V2 and the PNP bipolar junction transistor V3 are sequentially turned on. After the PNP bipolar junction transistor V3 is turned on, the constant voltage source Vin issues a high voltage-level fault signal to the control module N. After the current outputted from the constant voltage source Vin is received by the control module N, the voltage conversion module 4 is disabled by the control module N.

Please refer to FIG. 8 again. The control module N comprises a controlling unit N0, a feedback pin FB, a start pin BO, a protection pin CS, a drive pin Drv and a supply voltage pin Vcc.

The feedback pin FB is connected to the collector of the first bipolar junction transistor V1.

The start pin BO is connected to a start signal input terminal and a light-adjusting signal input terminal of an external circuit board.

The protection pin CS is connected to the source terminal of the MOS transistor V, the anode of the regulator diode Vz and the collector of the PNP bipolar junction transistor V3.

The drive pin Drv is connected to the gate terminal of the MOS transistor V.

The supply voltage pin Vcc is connected to the current output terminal of the external power source in order to receive the current from the external power source.

According to a start signal received by the start signal input terminal, the controlling unit N0 issues a high or low voltage-level control signal to the voltage conversion module 4 through the drive pin Drv in order to enable or disable the voltage conversion module 4.

Moreover, according to a light-adjusting signal received by the light-adjusting signal input terminal, the controlling unit N0 changes the duty cycle of the high or low voltage-level control signal, which is issued through the drive pin Drv. Consequently, the frequency of enabling or disabling the voltage conversion module 4 is controlled by the controlling unit N0.

Moreover, after the fault signal is received by the protection pin CS, the voltage conversion module 4 is disabled by the controlling unit N0.

The feedback pin FB is used for adaptively feeding back the magnitude of the current and/or the voltage from the first power consumption module 31. The start pin BO is used for receiving the start signal input terminal from an external circuit board (e.g. a main board of the display device) and inputting the start signal into the controlling unit N0, thereby enabling the working state of the controlling unit N0. In a case that the external circuit board is the main board of the display device, the light-adjusting signal is a backlight-adjusting signal (i.e. a PWM signal) from the main board of the display device, and the start signal is a backlight-enabling signal (i.e. a SW signal) from the main board of the display device.

Figure 9:
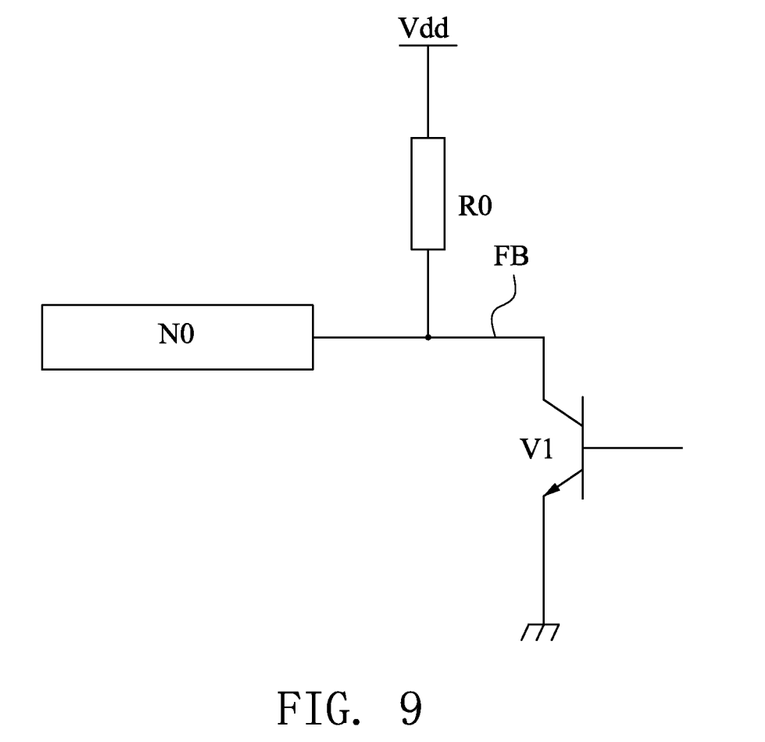
FIG. 9 schematically illustrates the connection between the controlling unit and a constant voltage input terminal of the drive circuit of FIG. 8.

FIG. 9 schematically illustrates the connection between the controlling unit and a constant voltage input terminal of the drive circuit of FIG. 8. As shown in FIG. 9, the feedback pin FB and the controlling unit N0 are connected to a constant voltage input terminal Vdd through a divider resistor R0. The voltage outputted from the constant voltage input terminal Vdd is a constant voltage. When the first bipolar junction transistor V1 connected to the feedback pin FB is turned on, the current flowing through the feedback pin FB and the divider resistor R0 is increased, and the voltage at the divider resistor R0 is decreased. On the other hand, when the first bipolar junction transistor V1 connected to the feedback pin FB is turned off, the current flowing through the feedback pin FB and the divider resistor R0 is decreased, and the voltage at the divider resistor R0 is increased. By detecting the magnitude of the voltage at the feedback pin FB and the divider resistor R0, the controlling unit N0 can sense the magnitude of the current flowing through the first power consumption module 31.

By changing the duty cycle of the high or low voltage-level control signal from the drive pin Drv, the controlling unit N0 can control the frequency of enabling or disabling the voltage conversion module 4. If the duty cycle of the high or low voltage-level control signal is increased, the time period of enabling the voltage conversion module 4 is prolonged, and the magnitude of the output current is increased. Consequently, the power of the power consumption module 3 is increased. In a case that the power consumption module 3 is an LED light strip, the magnitude of the current inputted into the LED light strip is increased, and the luminance of the light beam emitted by the LED light strip is increased. In other words, by adjusting the frequency of enabling or disabling the voltage conversion module 4, the controlling unit N0 can control the power consumption of the power consumption module 3.

In an embodiment, the control module N may be implemented by at least one chip with plural pins. Alternatively, the control module N may be implemented by a circuit composed with a chip and plural electronic components. It is preferred that the control module N is implemented by at least one chip with plural pins.

Hereinafter, the operations of the drive circuit of the present invention will be illustrated with reference to FIGS. 3, 4, 5 and 8.

Firstly, the control module N issues a high voltage-level or low voltage-level control signal to the gate terminal of the MOS transistor V to control the on/off states of the MOS transistor V, thereby determining whether the boost operation of the voltage conversion module 4 is performed or not. Moreover, by adjusting the duty cycle of the voltage-level control signal, the duration and the frequency of the boost operation of the voltage conversion module 4 is correspondingly controlled. When the MOS transistor V is turned on, the boost inductor L may store electric energy, and thus the output voltage from the voltage conversion module 4 is decreased. On the other hand, when the MOS transistor V is turned off, the voltage at the boost inductor L is increased, and thus the voltage transmitted from the voltage conversion module 4 to the voltage input terminal Uin is correspondingly increased.

Moreover, the current that is inputted into the voltage input terminal Uin and flows through the coupling module 1 is an AC pulsating current whose waveform is similar to a sawtooth wave. When the MOS transistor V is turned off, the first capacitor C1 is charged by the voltage input terminal Uin through the coupling module 1. Consequently, the first power consumption module 31 is continuously illuminated by the first capacitor C1. When the MOS transistor V is turned on, the second capacitor C2 is charged by the voltage input terminal Uin through the coupling module 1. Consequently, the second power consumption module 32 is continuously illuminated by the second capacitor C2.

The path of the AC pulsating current through the first power consumption module 31 and the second power consumption module 32 may be concluded as: the voltage input terminal Uin→the coupling module 1→the second diode VD2→the first capacitor C1 and the first power consumption module 31→the ground terminal→the second capacitor C2 and the second power consumption module 32→the first diode VD1→the coupling module 1→the MOS transistor V→the ground terminal. In other words, the first power consumption module 31 and the second power consumption module 32 are connected with each other in series.

In some situations, the current flowing through the first power consumption module 31 and the current flowing through the second power consumption module 32 are not equalized. For example, the current flowing through the first power consumption module 31 is higher than the current flowing through the second power consumption module 32 during a certain cycle. Under this circumstance, one voltage error is accumulated in the coupling module 1. During the next cycle, the current flowing through the first power consumption module 31 and the current flowing through the second power consumption module 32 are equalized. Since the voltage at the coupling module 1 is fixed, if one voltage error is accumulated in the coupling module 1, the charging/discharging process will be adjusted during the next cycle in order to kept the voltage of the coupling module 1 unchanged. Eventually, the current is equalized.

From the above discussions, the magnitude of the current from the current output terminal of the first power consumption module 31 may be sensed by the control module N through the collector of the first bipolar junction transistor V1. Moreover, by adjusting the duty cycle of the MOS transistor V of the boost circuit, the magnitude of the output voltage is correspondingly controlled by the control module N. Consequently, the current flowing through the first power consumption module 31 and the current flowing through the second power consumption module 32 can be controlled. In a case that both of the first power consumption module 31 and the second power consumption module 32 are LED light strips, when the LED light strips are turned on, the forward voltage drop Vf is constant. Consequently, the voltage at the LED light strip $U=Vf \times n$, where n is the number of the LED light strips. In other words, the drive circuit of the present invention only needs to control the current flowing through the first power consumption module 31 and the current flowing through the second power consumption module 32 instead of controlling the voltage of the LED light strips.

The liquid crystal display device of the present invention comprises two power consumption modules 3 as shown in FIG. 2 or 3 and a drive circuit as shown in FIG. 2, 3 or 8. The drive circuit is used for supplying power to the power consumption modules 3. In addition, of the power consumption modules 3 comprises one LED light strip or at least two serially-connected LED light strips.

The features of the liquid crystal display device of the present invention are similar to those of the above-mentioned drive circuit, and are not redundantly described herein.

Moreover preferably, the liquid crystal display device of the present invention is a 32-inch to 37-inch lateral-emitting liquid crystal display device. Since the lateral-emitting liquid crystal display device is usually equipped with two LED light strips, the concepts of the present invention are suitably applied to the lateral-emitting liquid crystal display device. It is noted that the concepts of the present invention may be applied to other display devices or comparable display devices similar to the 32-inch to 37-inch lateral-emitting liquid crystal display devices.

Moreover, in the drive circuit as shown in FIG. 2 or FIG. 3, the power consumption module 3 may comprise other electronic components instead of the LED light strips.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A light emitting diode (LED) backlight source drive circuit, comprising:
    a voltage input terminal;
    a coupling module connected to the voltage input terminal for receiving a current complying with a total working voltage of two power consumption modules from the voltage input terminal, and converting the current into a current complying with a working voltage of one power consumption module; and
    a rectifier module connected to the coupling module for inputting the current complying with the working voltage of one power consumption module into two serially-connected power consumption modules, thereby supplying power to the power consumption modules;
    wherein the rectifier module comprises a first current input terminal, a current output terminal and a second current input terminal;
    wherein the first current input terminal of the rectifier module is connected to the coupling module for inputting the current complying with the working voltage of one power consumption module into two serially-connected power consumption modules, the current output terminal of the rectifier module is connected to a current input terminal of the two serially-connected power consumption modules, and the second current input terminal of the rectifier module is connected to a current output terminal of the two serially-connected power consumption modules;
    wherein the LED backlight source ddrive circuit further comprising a voltage conversion module, a control.module and a protecting module;
    wherein the voltage conversion module is configured for receiving the current from a current output terminal of an external power source, and converting the current into the current complying with the total working voltage of two power consumption modules to be inputted into the coupling module;
    wherein the protecting module is connected to the control module, wherein if the power consumption module is in an open-circuit state, an over-current state or a short-circuit state, the protecting module issues a high or low voltage-level fault signal to the control module; and
    wherein after the fault signal is received by the control module, the voltage conversion module is disabled by the control module.

2. The LED backlight source drive circuit according to claim 1, wherein the coupling module comprises at least one capacitor or at least two serially-connected or parallel-connected capacitors;
    and/or the two power consumption modules have the same power;
    and/or each of the two power consumption modules comprises one LED light strip or at least two serially-connected LED light strips;
    and/or the rectifier module comprises a rectifying unit and an energy storage unit;
    wherein the rectifying unit is configured for inputting the current complying with the working voltage of one power consumption module into the energy storage unit; and
    wherein the energy storage unit is configured for receiving and storing the current from the rectifying unit, and inputting the current into the two power consumption modules.

3. The LED backlight source drive circuit according to claim 2, wherein the capacitor of the coupling module is an electrodeless capacitor; and/or the rectifying unit comprises a first diode and a second diode, the energy storage unit comprises a first capacitor and a second capacitor, and the two power consumption modules comprises a first power consumption module and a second power consumption module;

wherein an anode of the first diode is connected to the coupling module, a cathode of the first diode is connected to a current input terminal of the first power consumption module, and a current output terminal of the first power consumption module is connected to a current input terminal of the second power consumption module and a ground terminal;

wherein a cathode of the second diode is connected to the coupling module, and an anode of the second diode is connected to a current output terminal of the second power consumption module;

wherein two ends of the first capacitor are connected between the current input terminal and the current output terminal of the first power consumption module; and wherein two ends of the second capacitor are connected between the current input terminal and the current output terminal of the second power consumption module.

4. The LED backlight source drive circuit according to claim 3, wherein the coupling module, the first capacitor and/or the second capacitor are polypropylene capacitors.

5. The LED backlight source drive circuit according to claim 1, further comprising a current sampling module;

wherein the voltage conversion module is connected to the control module and the coupling module, and the current sampling module is connected to the control module and a current output terminal of the first power consumption module;
and wherein the control module is configured for sensing a magnitude of the current from the current output terminal of the first power consumption module through the current sampling module, and allowing the current outputted from the voltage conversion module to be used as a working current of the power consumption modules.

6. The LED backlight source drive circuit according to claim 5, wherein the voltage conversion module is a boost circuit; and/or the control module is a control chip; and/or the current sampling module comprises a first bipolar junction transistor, a first resistor and a second resistor;

wherein the first resistor is connected between the current output terminal of the first power consumption module and a ground terminal;

wherein a base of the first bipolar junction transistor is connected to a node between the current output terminal of the first power consumption module and the first resistor through the second resistor;

wherein an emitter of the first bipolar junction transistor is connected to the ground terminal, and a collector of the first bipolar junction transistor is connected to the control module; and wherein a magnitude of the current and/or the voltage from the current output terminal of the first power consumption module is sensed by the control module through the collector of the first bipolar junction transistor.

7. The LED backlight source drive circuit according to claim 1, wherein the voltage conversion module comprises a boost inductor, a metal-oxide-semiconductor MOS transistor and a fourth resistor, the protecting module comprises a NPN bipolar junction transistor, a PNP bipolar junction transistor, an energy storage capacitor, a fifth resistor, a sixth resistor and a regulator diode;

wherein a current input terminal of the boost inductor is connected to the current output terminal of the external power source, and a current output terminal of the boost inductor is connected to a drain terminal of the MOS transistor and the voltage input terminal;

wherein a source terminal of the MOS transistor is connected to the ground terminal through the fourth resistor, and a terminal of the MOS transistor is connected to the control module;

wherein an anode of the regulator diode is connected to the voltage input terminal, and a cathode of the regulator diode is connected to the ground terminal through the energy storage capacitor;

wherein the fifth resistor and the sixth resistor are connected to each other in series, and the energy storage capacitor is connected to the serially-connected fifth resistor and sixth resistor in parallel;

wherein the cathode of the regulator diode is connected to a node between the fifth resistor and the sixth resistor;

wherein the anode of the regulator diode is connected to the source terminal of the MOS transistor the control module, a base of the NPN bipolar junction transistor and an emitter of the PNP bipolar junction transistor;

wherein an emitter of the NPN bipolar junction transistor is connected to the ground terminal, and a collector of the NPN bipolar junction transistor is connected to a base of the PNP bipolar junction transistor; and wherein a collector of the PNP bipolar junction transistor is connected to the control module, an emitter of the PNP bipolar junction transistor is connected to a constant voltage source, and the fault signal is a voltage signal that is outputted from the constant voltage source.

8. The LED backlight source drive circuit according to claim 1, wherein the control module comprises a controlling unit, a feedback pin, a start pin, a protection pin, a drive pin and a supply voltage pin;

wherein the feedback pin is connected to the collector of the first bipolar junction transistor;

wherein the start pin is connected to a start signal input terminal and a light-adjusting signal input terminal of an external circuit board;

wherein the protection pin is connected to the source terminal of the MOS transistor, the anode of the regulator diode and the collector of the PNP bipolar junction transistor;

wherein the drive pin is connected to a gate terminal of the MOS transistor;

wherein the supply voltage pin is connected to the current output terminal of the external power source for receiving the current from the external power source;

wherein according to a start signal received by the start signal input terminal, the controlling unit issues a high or low voltage-level control signal to the voltage conversion module through the drive pin, thereby enabling or disabling the voltage conversion module;

wherein according to a light-adjusting signal received by the light-adjusting signal input terminal, the controlling unit changes a duty cycle of the high or low voltage-level control signal that is issued through the drive pin, so that a frequency of enabling or disabling the voltage conversion module is controlled by the controlling unit; and wherein after the fault signal is received by the protection pin, the voltage conversion module is disabled by the controlling unit.

9. A liquid crystal display device, comprising:
two power consumption modules; and
the LED backlight source drive circuit according to claim 1 for supplying power to the power consumption modules, wherein each of the power consumption modules comprises one LED light strip or at least two serially-connected LED light strips.

10. A light emitting diode (LED) backlight source drive circuit, comprising:
a voltage input terminal;
a coupling module connected to the voltage input terminal for receiving a current complying with a total working voltage of two power consumption modules from the voltage input terminal, and converting the current into a current complying with a working voltage of one power consumption module; and
a rectifier module connected to the coupling module for inputting the current complying with the working voltage of one power consumption module into two serially-connected power consumption modules, thereby supplying power to the power consumption modules;
wherein the rectifier module comprises a rectifying unit, and the rectifying unit is configured for directly inputting the current into one of the two serially-connected power consumption modules;
wherein the LED backlight source drive circuit further comprising a voltage conversion module a control module and a protecting module;
wherein the voltage conversion module is configured for receiving the current from a current output terminal of an external power source and converting the current into the current complying with the total working voltage of two power consumption modules to be inputted into the coupling module;
wherein the protecting module is connected to the control module wherein if the power consumption module is in an open-circuit state an over-current state or a short-circuit state the protecting module issues a high or low voltage-level fault signal to the control module; and
wherein after fault signal is received by the control module, the voltage conversion module is disabled by the control module.

11. The LED backlight source drive circuit according to claim 10, wherein the coupling module comprises at least one capacitor or at least two serially-connected or parallel-connected capacitors;
and/or the two power consumption modules have the same power;
and/or each of the two power consumption modules comprises one LED light strip or at least two serially-connected LED light strips;
and/or the rectifier module comprises an energy storage unit;
wherein the rectifying unit is configured for inputting the current complying with the working voltage of one power consumption module into the energy storage unit; and
wherein the energy storage unit is configured for receiving and storing the current from the rectifying unit, and inputting the current into the two power consumption modules.

12. The LED backlight source drive circuit according to claim 11, wherein the capacitor of the coupling module is an electrodeless capacitor; and/or the rectifying unit comprises a first diode and a second diode, the energy storage unit comprises a first capacitor and a second capacitor, and the two power consumption modules comprises a first power consumption module and a second power consumption module;
wherein an anode of the first diode is connected to the coupling module, a cathode of the first diode is connected to a current input terminal of the first power consumption module, and a current output terminal of the first power consumption module is connected to a current input terminal of the second power consumption module and a ground terminal;
wherein a cathode of the second diode is connected to the coupling module, and an anode of the second diode is connected to a current output terminal of the second power consumption module;
wherein two ends of the first capacitor are connected between the current input terminal and the current output terminal of the first power consumption module; and
wherein two ends of the second capacitor are connected between the current input terminal and the current output terminal of the second power consumption module.

13. The LED backlight source drive circuit according to claim 12, wherein the coupling module, the first capacitor and/or the second capacitor are polypropylene capacitors.

14. The LED backlight source drive circuit according to claim 10, further comprising a current sampling module;
wherein the voltage conversion module is connected to the control module and the coupling module, and the current sampling module is connected to the control module and a current output terminal of the first power consumption module;
and
wherein the control module is configured for sensing a magnitude of the current from the current output terminal of the first power consumption module through the current sampling module, and allowing the current outputted from the voltage conversion module to be used as a working current of the power consumption modules.

15. The LED backlight source drive circuit according to claim 14, wherein the voltage conversion module is a boost circuit; and/or the control module is a control chip; and/or the current sampling module comprises a first bipolar junction transistor, a first resistor and a second resistor;
wherein the first resistor is connected between the current output terminal of the first power consumption module and a ground terminal;
wherein a base of the first bipolar junction transistor is connected to a node between the current output terminal of the first power consumption module and the first resistor through the second resistor;
wherein an emitter of the first bipolar junction transistor is connected to the ground terminal, and a collector of the first bipolar junction transistor is connected to the control module; and
wherein a magnitude of the current and/or the voltage from the current output terminal of the first power consumption module is sensed by the control module through the collector of the first bipolar junction transistor.

16. The LED backlight source drive circuit according to claim 10, wherein the voltage conversion module comprises a boost inductor, a metal-oxide-semiconductor (MOS) transistor and a fourth resistor, the protecting module comprises a NPN bipolar junction transistor, a PNP bipolar junction transistor, an energy storage capacitor, a fifth resistor, a sixth resistor and a regulator diode;
wherein a current input terminal of the boost inductor is connected to the current output terminal of the external power source, and a current output terminal of the boost inductor is connected to a drain terminal of the MOS transistor and the voltage input terminal;

wherein a source terminal of the MOS transistor is connected to the ground terminal through the fourth resistor, and a terminal of the MOS transistor is connected to the control module;

wherein an anode of the regulator diode is connected to the voltage input terminal, and a cathode of the regulator diode is connected to the ground terminal through the energy storage capacitor;

wherein the fifth resistor and the sixth resistor are connected to each other in series, and the energy storage capacitor is connected to the serially-connected fifth resistor and sixth resistor in parallel;

wherein the cathode of the regulator diode is connected to a node between the fifth resistor and the sixth resistor;

wherein the anode of the regulator diode is connected to the source terminal of the MOS transistor, the control module, a base of the NPN bipolar junction transistor and an emitter of the PNP bipolar junction transistor;

wherein an emitter of the NPN bipolar junction transistor is connected to the ground terminal, and a collector of the NPN bipolar junction transistor is connected to a base of the PNP bipolar junction transistor; and wherein a collector of the PNP bipolar junction transistor is connected to the control module, an emitter of the PNP bipolar junction transistor is connected to a constant voltage source, and the fault signal is a voltage signal that is outputted from the constant voltage source.

17. The LED backlight source drive circuit according to claim 10, wherein the control module comprises a controlling unit, a feedback pin, a start pin, a protection pin, a drive pin and a supply voltage pin;

wherein the feedback pin is connected to the collector of the first bipolar junction transistor;

wherein the start pin is connected to a start signal input terminal and a light-adjusting signal input terminal of an external circuit board;

wherein the protection pin is connected to the source terminal of the MOS transistor, the anode of the regulator diode and the collector of the PNP bipolar junction transistor;

wherein the drive pin is connected to a gate terminal of the MOS transistor;

wherein the supply voltage pin is connected to the current output terminal of the external power source for receiving the current from the external power source;

wherein according to a start signal received by the start signal input terminal, the controlling unit issues a high or low voltage-level control signal to the voltage conversion module through the drive pin, thereby enabling or disabling the voltage conversion module;

wherein according to a light-adjusting signal received by the light-adjusting signal input terminal, the controlling unit changes a duty cycle of the high or low voltage-level control signal that is issued through the drive pin, so that a frequency of enabling or disabling the voltage conversion module is controlled by the controlling unit; and wherein after the fault signal is received by the protection pin, the voltage conversion module is disabled by the controlling unit.

* * * * *